(12) United States Patent
Sato

(10) Patent No.: US 12,311,464 B2
(45) Date of Patent: May 27, 2025

(54) ELECTRIC WIRE MANUFACTURING METHOD AND ELECTRIC WIRE MANUFACTURING APPARATUS

(71) Applicant: Yazaki Corporation, Tokyo (JP)

(72) Inventor: Kei Sato, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 970 days.

(21) Appl. No.: 17/376,438

(22) Filed: Jul. 15, 2021

(65) Prior Publication Data

US 2022/0023971 A1 Jan. 27, 2022

(30) Foreign Application Priority Data

Jul. 22, 2020 (JP) ................................ 2020-124830

(51) Int. Cl.
*B23K 26/00* (2014.01)
*B23K 26/24* (2014.01)
*H01R 4/18* (2006.01)
*H01R 43/02* (2006.01)

(52) U.S. Cl.
CPC ............. *B23K 26/24* (2013.01); *H01R 4/187* (2013.01); *H01R 43/0221* (2013.01)

(58) Field of Classification Search
CPC .................... H01R 43/048; B23K 2101/38
See application file for complete search history.

(56) References Cited

U.S. PATENT DOCUMENTS

| 3,626,363 | A | * | 12/1971 | McIver | H01R 43/0585 |
| | | | | | 439/880 |
| 4,383,164 | A | * | 5/1983 | Eto | B23K 26/244 |
| | | | | | 219/121.64 |
| 4,966,565 | A | * | 10/1990 | Dohi | H01R 4/187 |
| | | | | | 29/860 |
| 5,877,472 | A | * | 3/1999 | Campbell | H01R 4/029 |
| | | | | | 219/121.64 |
| 9,548,545 | B2 | * | 1/2017 | Yagi | H01R 4/183 |
| 10,483,657 | B2 | * | 11/2019 | Nabeta | H01R 4/187 |
| 10,797,457 | B2 | * | 10/2020 | Sato | B23K 20/10 |
| 10,826,261 | B2 | * | 11/2020 | Sato | B23K 20/004 |
| 2004/0142607 | A1 | * | 7/2004 | Asakura | H01R 43/0221 |
| | | | | | 439/877 |

(Continued)

FOREIGN PATENT DOCUMENTS

| CN | 110021828 A | 7/2019 |
| JP | 2013-222625 A | 10/2013 |

(Continued)

*Primary Examiner* — Ibrahime A Abraham
*Assistant Examiner* — Lawrence H Samuels
(74) *Attorney, Agent, or Firm* — Sughrue Mion, PLLC

(57) ABSTRACT

An electric wire manufacturing method includes a step of placing a core wire having a plurality of strands inside a tubular member capable of transmitting laser light, and a step of forming a joined portion where the strands are joined together by emitting laser light along a direction intersecting an axial direction of the tubular member onto an outer circumferential surface of the core wire placed inside the tubular member. The tubular member is, for example, transparent. The laser light transmitted through the tubular member may be emitted onto the outer circumferential surface of the core wire in the step of forming the joined portion.

18 Claims, 19 Drawing Sheets

(56) References Cited

U.S. PATENT DOCUMENTS

| | | | |
|---|---|---|---|
| 2006/0194009 A1* | 8/2006 | Tajima | B29C 66/81267 428/35.2 |
| 2010/0270275 A1* | 10/2010 | Nakamae | B23K 26/009 219/121.64 |
| 2011/0094797 A1* | 4/2011 | Otsuka | H01R 43/0207 29/857 |
| 2013/0040509 A1* | 2/2013 | Mitose | H01R 13/03 439/877 |
| 2013/0048616 A1* | 2/2013 | Morimoto | H01R 43/0221 219/121.64 |
| 2013/0115828 A1* | 5/2013 | Seifert | H01R 4/188 439/877 |
| 2014/0144016 A1* | 5/2014 | Bauer | B23K 26/21 29/863 |
| 2014/0203068 A1* | 7/2014 | Hino | H01R 43/0207 228/101 |
| 2014/0273667 A1* | 9/2014 | Tachibana | H01R 43/02 439/877 |
| 2014/0374155 A1* | 12/2014 | Tachibana | H01R 13/03 29/862 |
| 2015/0064991 A1* | 3/2015 | Kawamura | H01R 43/0221 439/879 |
| 2015/0126079 A1* | 5/2015 | Kawamura | H01R 13/52 439/877 |
| 2015/0357725 A1* | 12/2015 | Matsuo | H01R 43/02 439/877 |
| 2015/0364233 A1* | 12/2015 | Asami | H01R 4/70 29/869 |
| 2015/0364837 A1* | 12/2015 | Yagi | H01R 43/048 439/879 |
| 2016/0006135 A1* | 1/2016 | Terashima | H01R 43/02 174/72 A |
| 2016/0093984 A1* | 3/2016 | Iwamoto | H01R 13/65915 439/607.55 |
| 2016/0148720 A1* | 5/2016 | Kanagawa | H01B 7/04 29/869 |
| 2016/0156127 A1* | 6/2016 | Nomura | H01R 43/048 174/84 R |
| 2016/0372881 A1* | 12/2016 | Bauer | B23K 26/20 |
| 2017/0250476 A1* | 8/2017 | Aoyagi | H01B 7/00 |
| 2017/0338005 A1* | 11/2017 | Ito | H01B 7/282 |
| 2017/0343753 A1* | 11/2017 | Bauco | B29D 11/00663 |
| 2017/0346197 A1* | 11/2017 | Nabeta | H01R 4/206 |
| 2019/0052040 A1* | 2/2019 | Suzuki | H01R 4/029 |
| 2019/0165489 A1 | 5/2019 | Sato et al. | |
| 2019/0165492 A1* | 5/2019 | Warashina | H01R 43/048 |
| 2019/0165533 A1* | 5/2019 | Nabeta | H01R 43/28 |
| 2019/0165535 A1* | 5/2019 | Sato | H01R 43/048 |
| 2019/0224784 A1* | 7/2019 | Fujiwara | B23K 26/53 |
| 2019/0356062 A1* | 11/2019 | Sato | H01R 4/029 |
| 2020/0335926 A1* | 10/2020 | Takeda | H01R 4/70 |
| 2024/0186772 A1* | 6/2024 | Nakamura | B23K 26/57 |

FOREIGN PATENT DOCUMENTS

| | | |
|---|---|---|
| JP | 5794843 B2 | 10/2015 |
| WO | 2011/138465 A1 | 11/2011 |

\* cited by examiner

ELECTRIC WIRE MANUFACTURING METHOD AND ELECTRIC WIRE MANUFACTURING APPARATUS

CROSS-REFERENCE TO RELATED APPLICATION(S)

The present application claims priority to and incorporates by reference the entire contents of Japanese Patent Application No. 2020-124830 filed in Japan on Jul. 22, 2020.

BACKGROUND OF THE INVENTION

1. Field of the Invention

The present invention relates to an electric wire manufacturing method and an electric wire manufacturing apparatus.

2. Description of the Related Art

There is a conventional technique for melting an electric wire using a laser or the like. Japanese Patent No. 5794843 discloses a method for welding distal ends of electric wire conductors together, the method including irradiating the vicinity of the electric wire conductor distal ends with a high energy density beam to melt the electric wire conductor distal ends, integrating the melted distal ends by surface tension of molten metal, and solidifying the integrated distal end.

When a core wire having a plurality of strands is irradiated with a laser beam, the strands may be cut off by melting and scatter.

SUMMARY OF THE INVENTION

An object of the present invention is to provide an electric wire manufacturing method and an electric wire manufacturing apparatus capable of suppressing scattering of strands.

In order to achieve the above mentioned object, an electric wire manufacturing method according to one aspect of the present invention includes placing a core wire having a plurality of strands inside a tubular member capable of transmitting laser light; and forming a joined portion where the strands are joined together by emitting laser light along a direction intersecting an axial direction of the tubular member onto an outer circumferential surface of the core wire placed inside the tubular member.

According to another aspect of the present invention, in the electric wire manufacturing method, it is preferable that the tubular member is transparent, and in the forming the joined portion, the laser light transmitted through the tubular member is emitted onto the outer circumferential surface of the core wire.

According to still another aspect of the present invention, in the electric wire manufacturing method, it is preferable that in the forming the joined portion, the laser light is made to scan along the axial direction.

According to still another aspect of the present invention, in the electric wire manufacturing method, it is preferable that the electric wire manufacturing method further includes connecting a terminal to the joined portion, wherein the terminal is crimped to the joined portion, or the joined portion is brought into pressure contact with the terminal in the connecting the terminal.

According to still another aspect of the present invention, in the electric wire manufacturing method, it is preferable that the electric wire manufacturing method further includes joining the joined portion formed in a first electric wire and the joined portion formed in a second electric wire together.

According to still another aspect of the present invention, in the electric wire manufacturing method, it is preferable that in the placing the core wire, a plurality of the core wires are placed inside the tubular member, and in the forming the joined portion, the laser light is emitted onto the core wires to join the core wires together and form the single joined portion.

In order to achieve the above mentioned object, an electric wire manufacturing apparatus according to still another aspect of the present invention includes a tubular member capable of transmitting laser light; and an emitting part configured to emit laser light along a direction intersecting an axial direction of the tubular member onto an outer circumferential surface of a core wire placed inside the tubular member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an electric wire manufacturing method and an electric wire manufacturing apparatus according to embodiments of the present invention will be described in detail with reference to the drawings. It should be noted that these embodiments are not intended to limit the present invention. Additionally, constituent elements in the following embodiments include those easily arrived at by a person skilled in the art or those substantially the same as the constituent elements.

Embodiment

Figure 1:
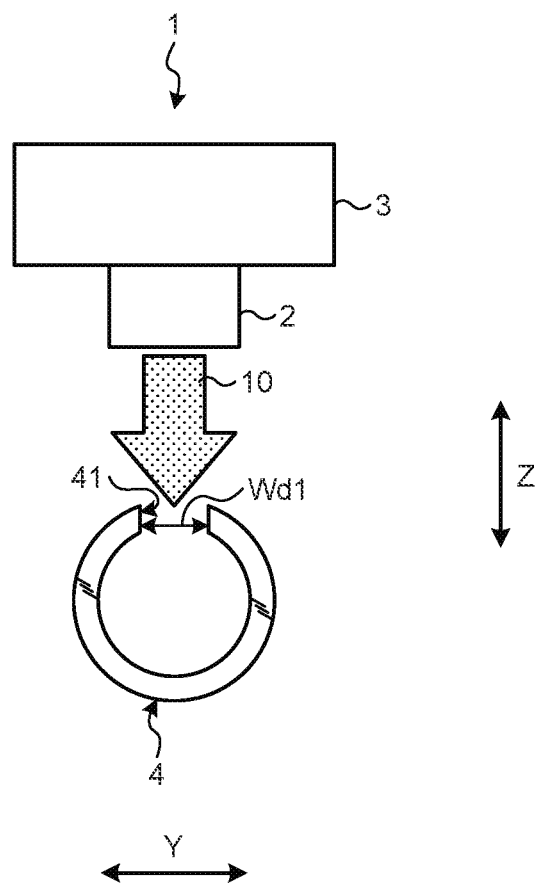
FIG. 1 is a view illustrating a schematic configuration of an electric wire manufacturing apparatus according to an embodiment.
Figure 2:
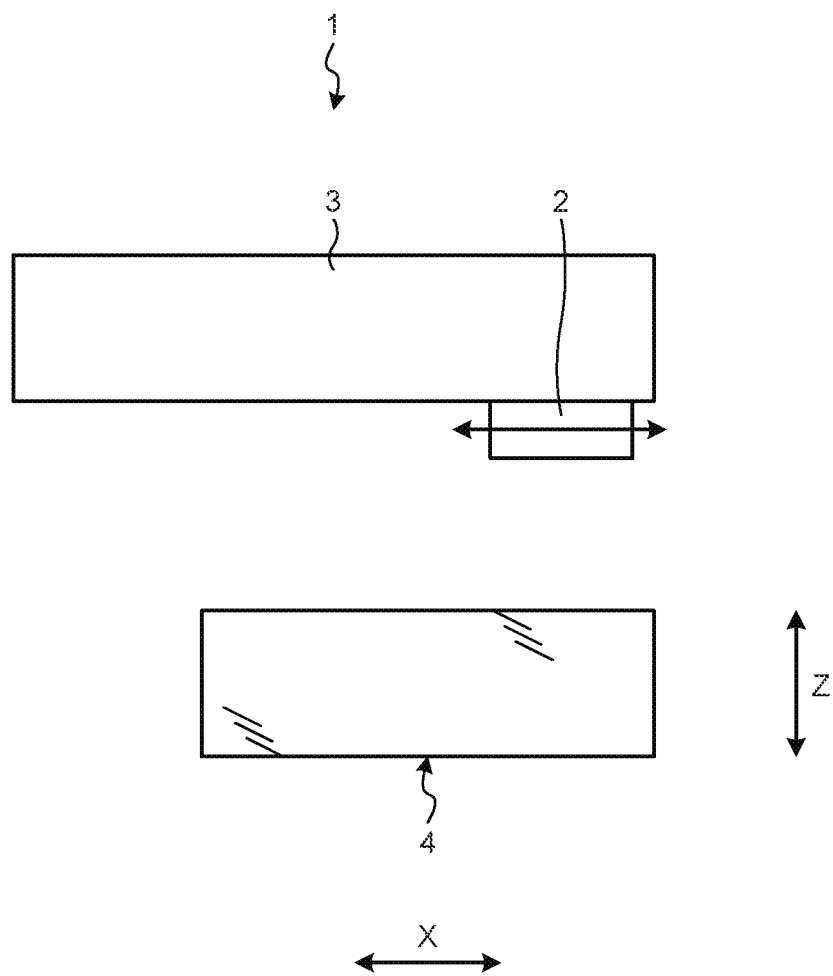
FIG. 2 is a side view of the electric wire manufacturing apparatus according to the embodiment.
Figure 3:
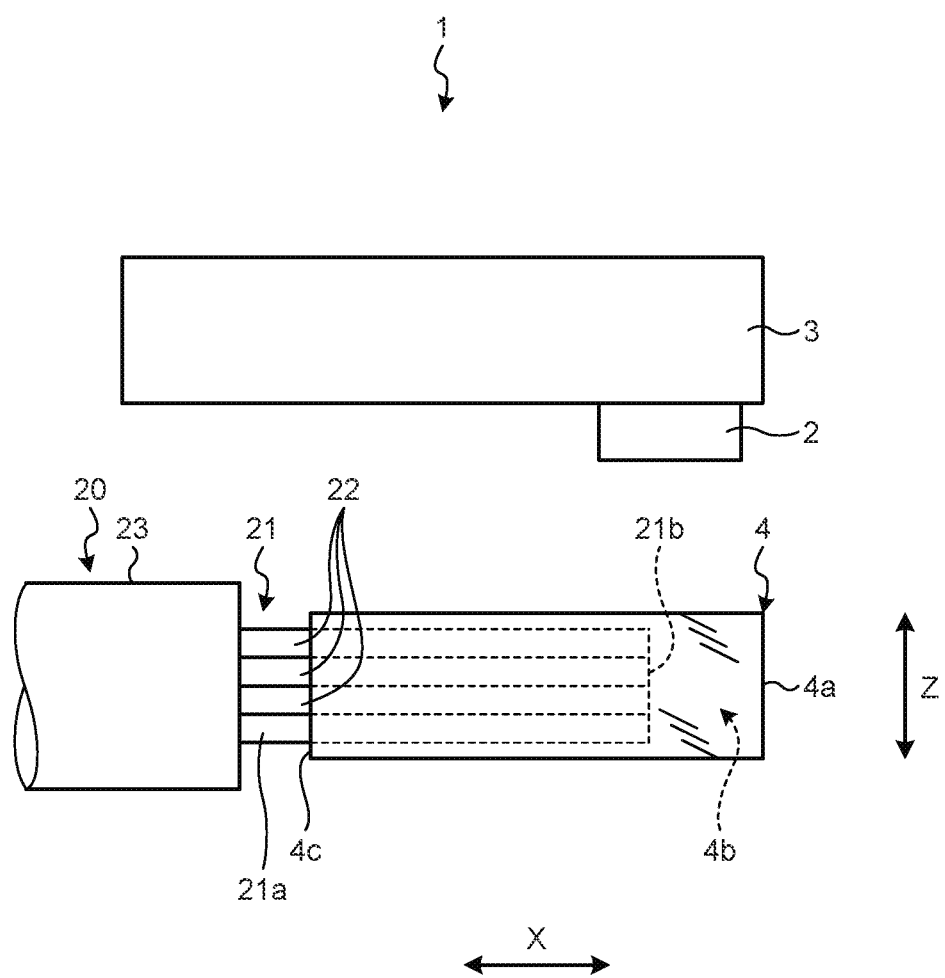
FIG. 3 is a view for explaining a placing step according to the embodiment.
Figure 4:
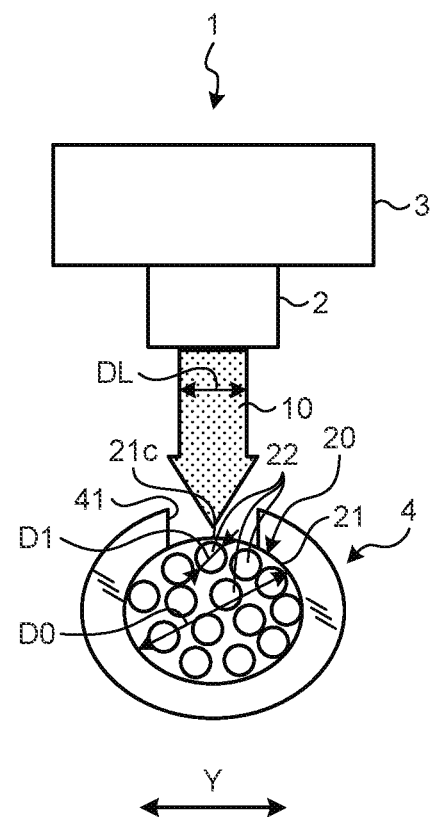
FIG. 4 is a view for explaining a joining step according to the embodiment.
Figure 5:
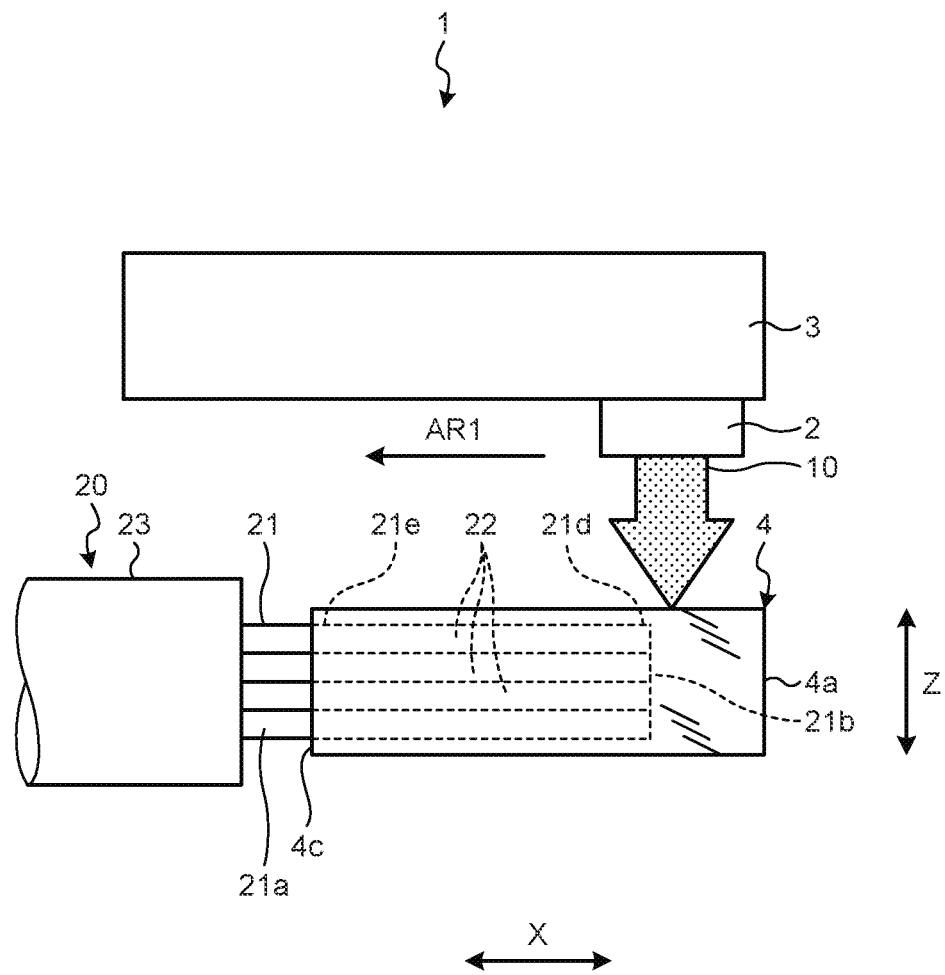
FIG. 5 is a view for explaining the joining step according to the embodiment.
Figure 6:
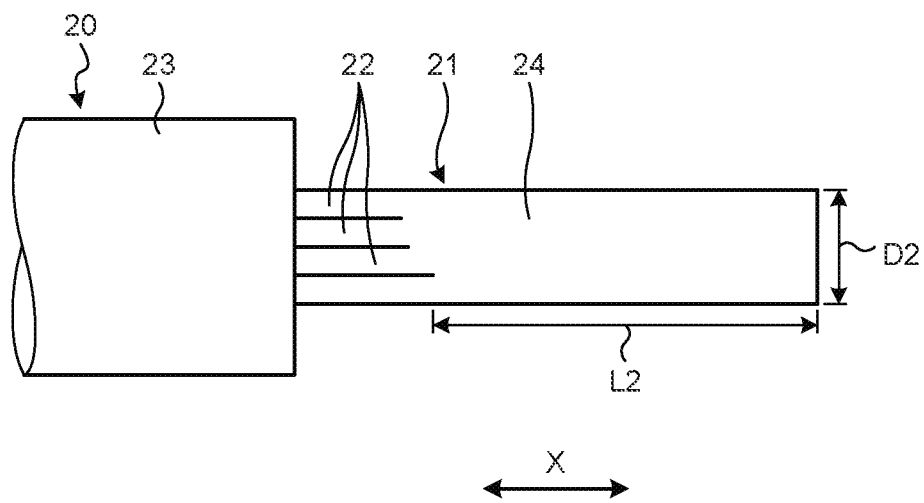
FIG. 6 is a view illustrating a joined portion formed in a core wire.
Figure 7:
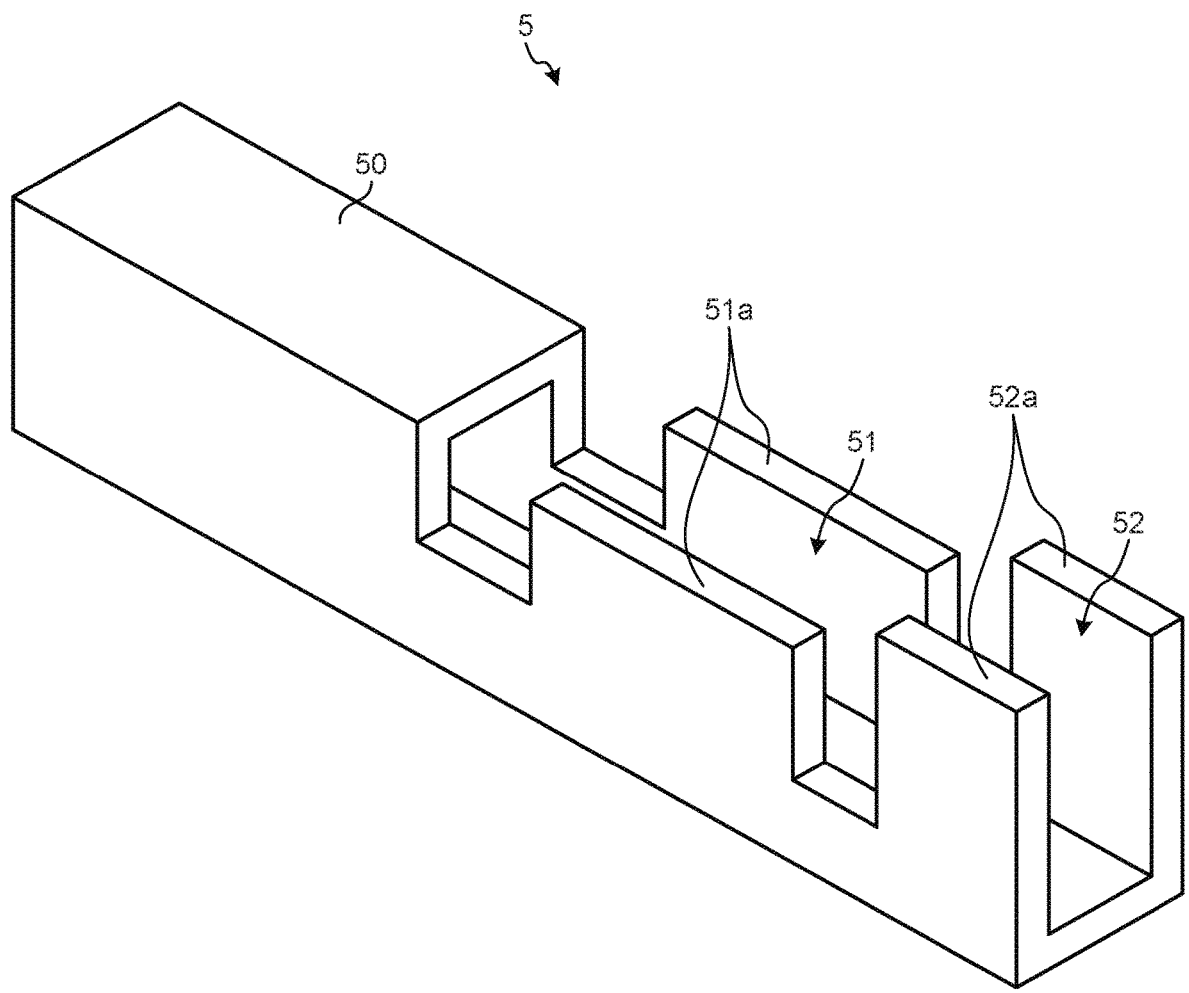
FIG. 7 is a perspective view illustrating an example of a terminal.
Figure 8:
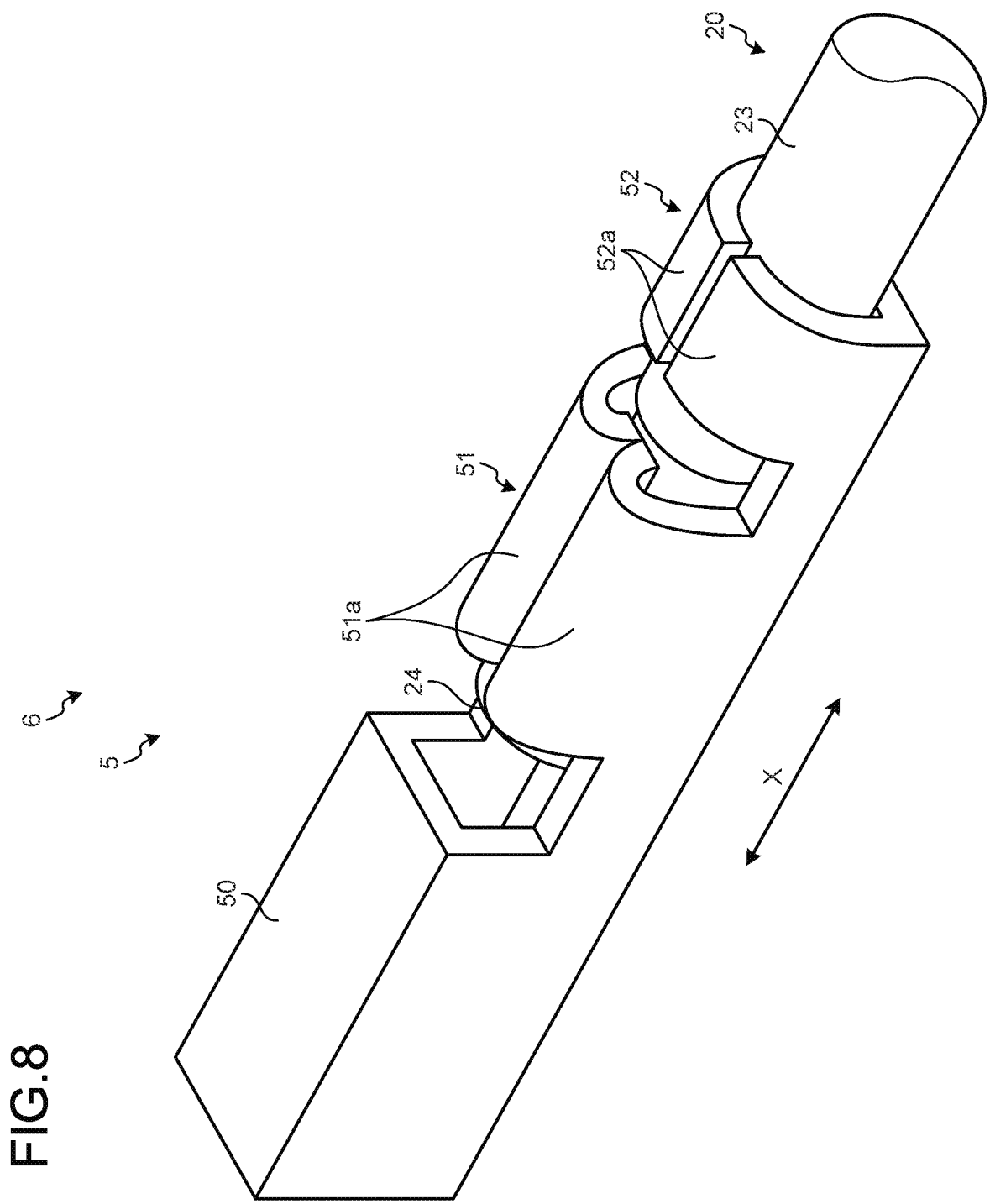
FIG. 8 is a perspective view illustrating a terminal crimped to an electric wire.
Figure 9:
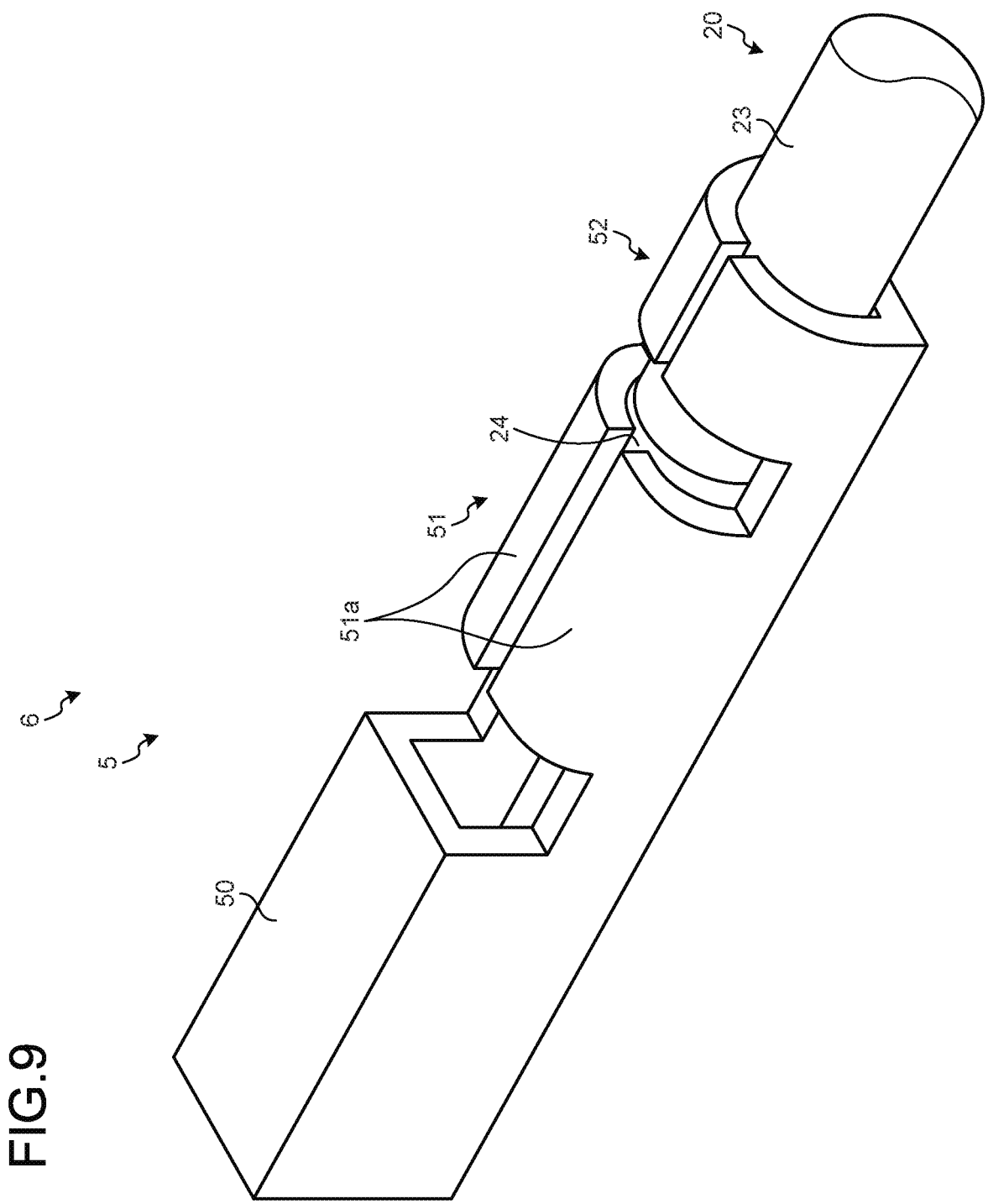
FIG. 9 is a perspective view illustrating a terminal welded to an electric wire.

An embodiment will be described with reference to FIGS. 1 to 14. The present embodiment relates to an electric wire manufacturing method and an electric wire manufacturing apparatus. FIG. 1 is a view illustrating a schematic configuration of an electric wire manufacturing apparatus according to an embodiment. FIG. 2 is a side view of the electric wire manufacturing apparatus according to the embodiment. FIG. 3 is a view for explaining a placing step according to the embodiment. FIG. 4 is a view for explaining a joining step according to the embodiment. FIG. 5 is a view for explaining the joining step according to the embodiment. FIG. 6 is a view illustrating a joined portion formed in a core wire. FIG. 7 is a perspective view illustrating an example of a terminal. FIG. 8 is a perspective view illustrating a terminal crimped to an electric wire. FIG. 9 is a perspective view illustrating a terminal welded to an electric wire.

Figure 10:
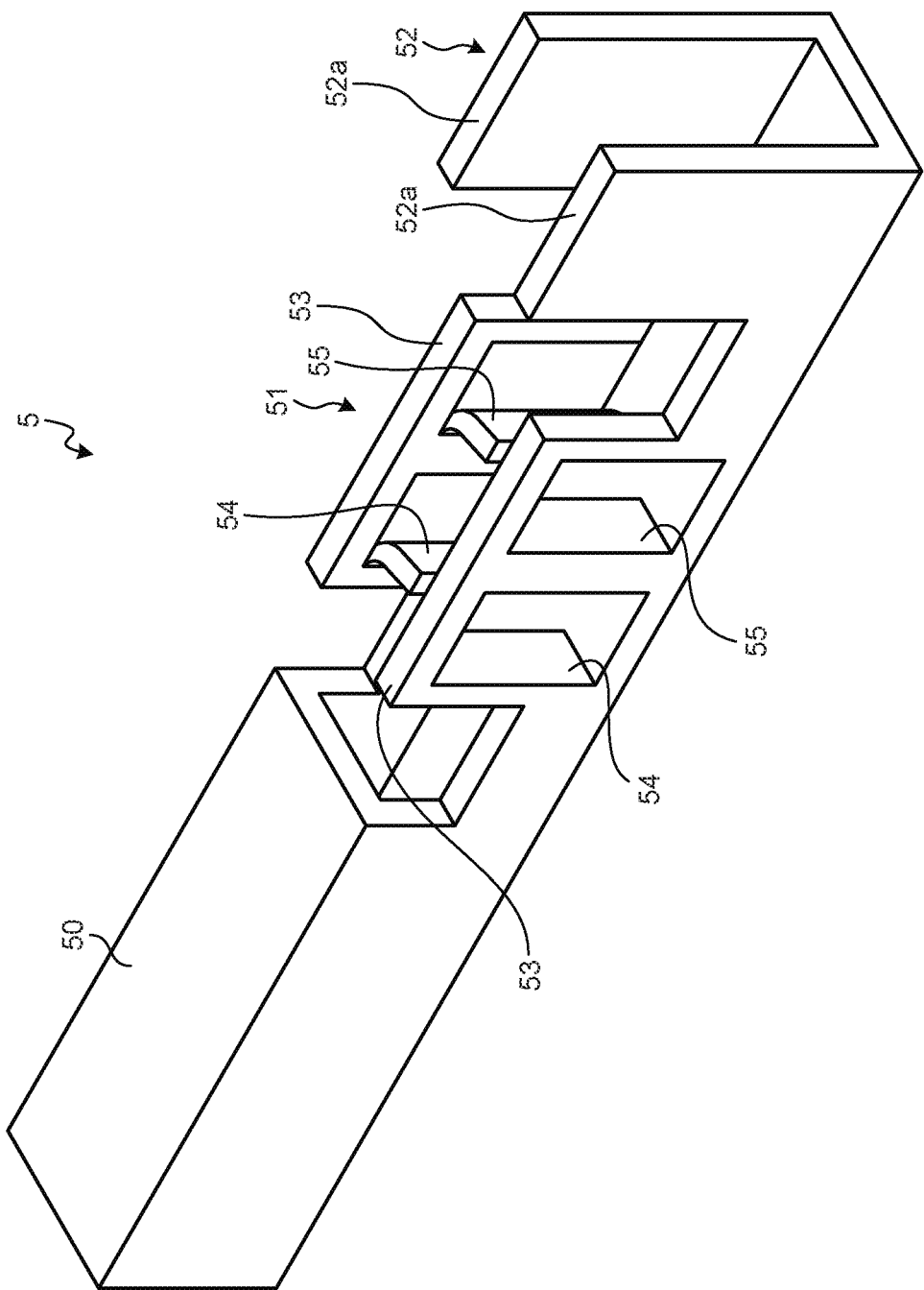
FIG. 10 is a perspective view illustrating an example of a pressure contact terminal.
Figure 11:
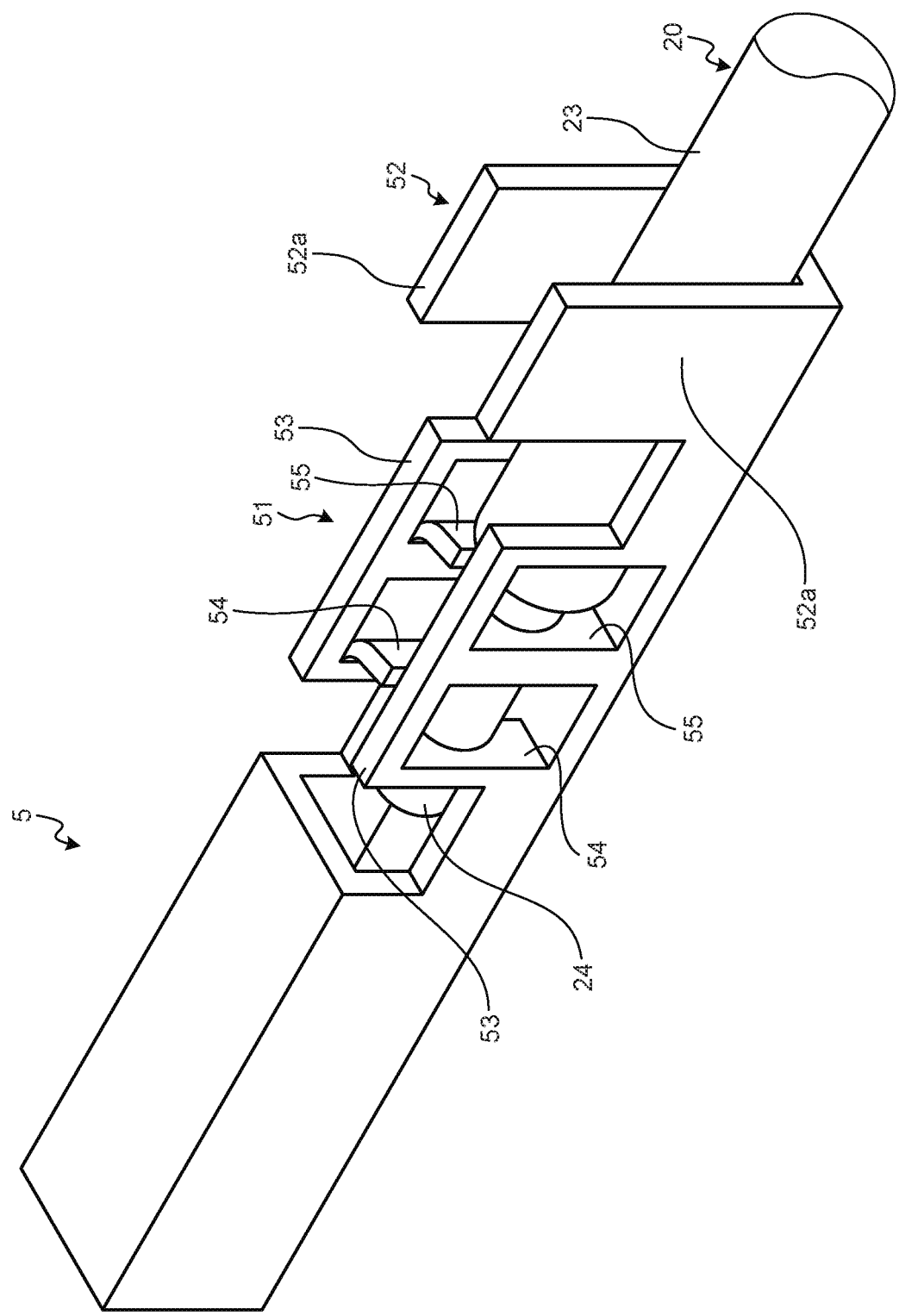
FIG. 11 is a perspective view illustrating an electric wire in pressure contact with the pressure contact terminal.
Figure 12:
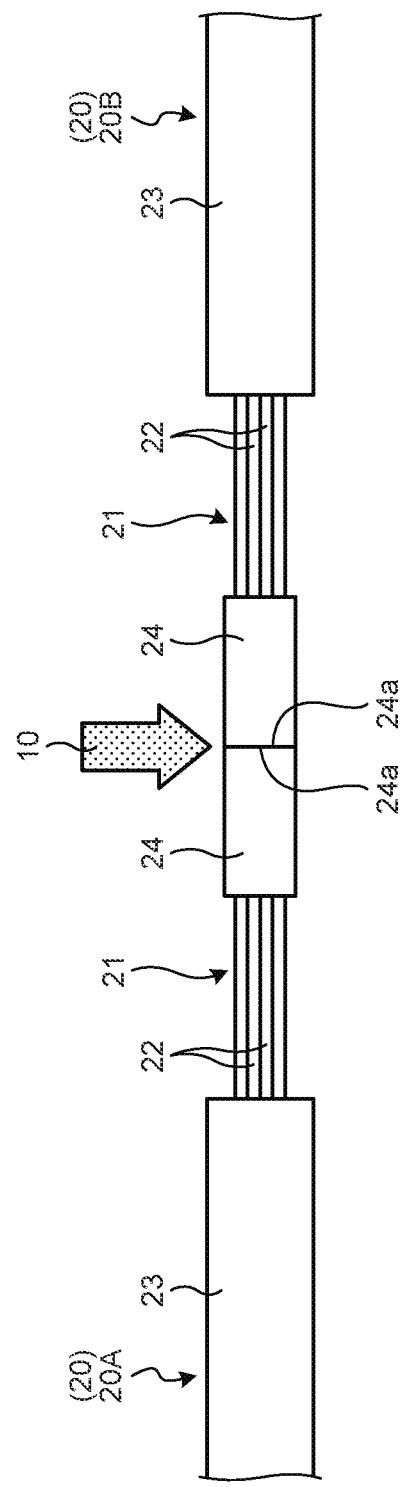
FIG. 12 is a view for explaining a step of forming an assembly of electric wires.
Figure 13:
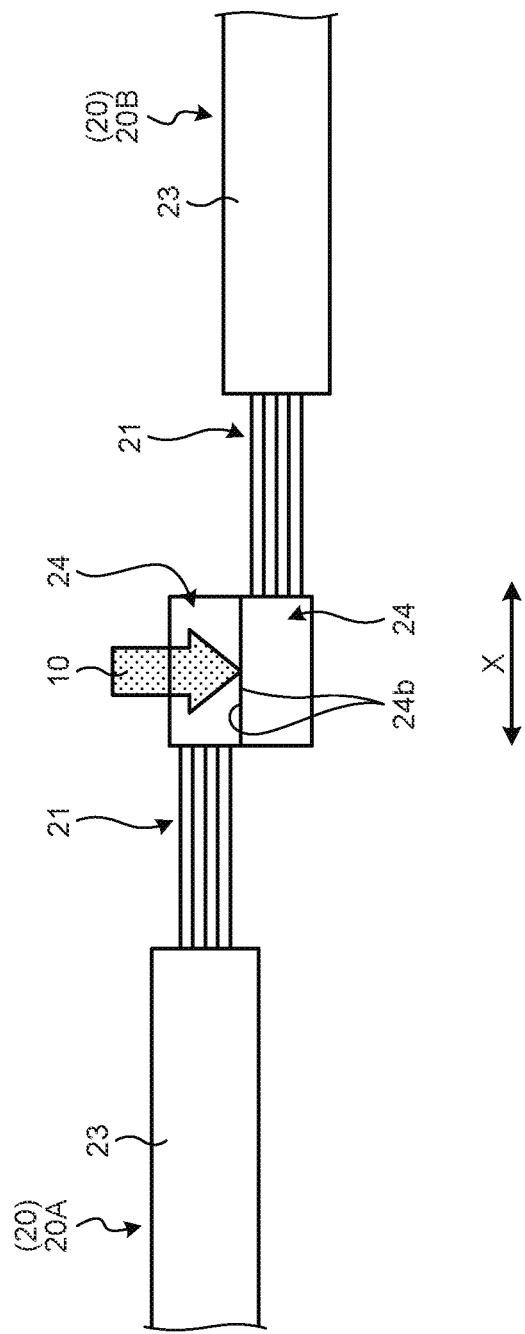
FIG. 13 is a view for explaining another step of forming an assembly of electric wires.
Figure 14:
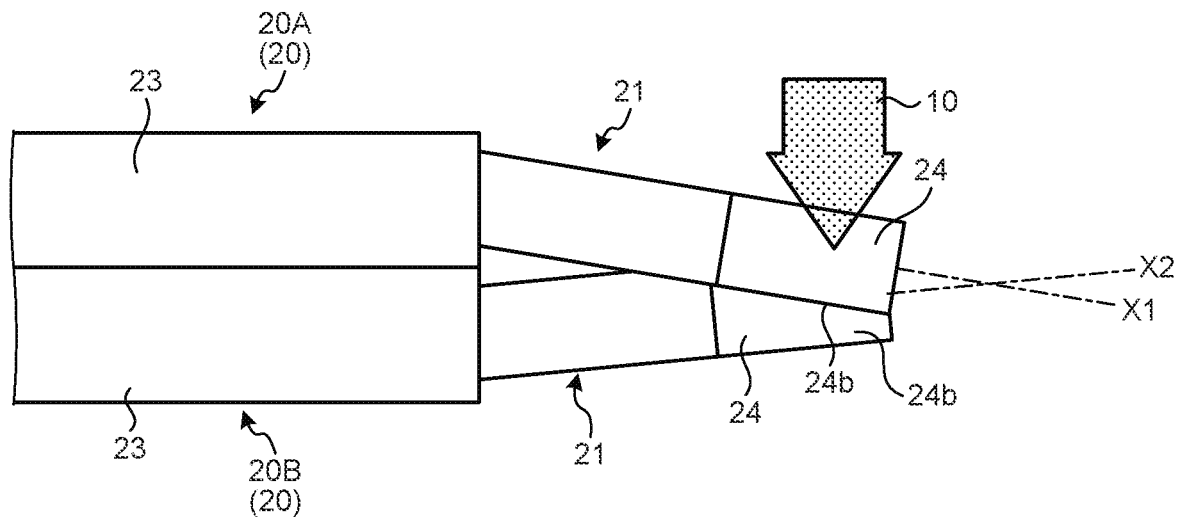
FIG. 14 is a view for explaining yet another step of forming an assembly of electric wires.

FIG. 10 is a perspective view illustrating an example of a pressure contact terminal. FIG. 11 is a perspective view illustrating an electric wire in pressure contact with the pressure contact terminal. FIG. 12 is a view for explaining a step of forming an assembly of electric wires. FIG. 13 is a view for explaining another step of forming an assembly of electric wires. FIG. 14 is a view for explaining yet another step of forming an assembly of electric wires.

As illustrated in FIGS. 1 and 2, an electric wire manufacturing apparatus 1 according to the present embodiment includes an emitting part 2, a moving mechanism 3, and a jig 4. As illustrated in FIGS. 4 and 5, the electric wire manufacturing apparatus 1 is an apparatus that emits laser light 10 onto a core wire 21 of an electric wire 20. The emitted laser light 10 joins strands 22 of the core wire 21 together to form a joined portion 24.

The jig 4 is a tubular member capable of transmitting the laser light 10. The emitting part 2 emits the laser light 10 onto the core wire 21 placed inside the jig 4. When the laser light 10 is emitted onto the core wire 21, the strands 22 may be cut off by melting and scatter. The electric wire manufacturing apparatus 1 of the present embodiment can prevent the scattering of the strands 22 by emitting the laser light 10 while covering the core wire 21 with the jig 4.

The jig 4 is formed of a material having transmittance of the laser light 10 of a predetermined value or more. The predetermined value is, for example, 90%. The laser light 10 emitted from the emitting part 2 may have any desired wavelength as long as the laser light 10 can melt the strands 22. The jig 4 is made of, for example, transparent quartz glass. The transparent quartz glass has such a characteristic that light transmittance is high over all wavelengths including ultraviolet and infrared as compared to other kinds of glass (e.g., silicate glass). The quartz glass transmits most of the laser light 10 and hardly absorbs the laser light 10.

The jig 4 has a melting point higher than that of the core wire 21. For example, the core wire 21 is formed of conductive metal such as copper and aluminum. The melting point of copper is 1,085° C., and the melting point of aluminum is 660° C. Meanwhile, a softening temperature of quartz glass is, for example, 1,600° C. Thus, it is possible to melt the core wire 21 without melting the quartz glass. The quartz glass is also chemically stable since it is corroded only by limited chemicals such as hydrofluoric acid.

The jig 4 may be made of a material other than the quartz glass. For example, the material of the jig 4 is selected from materials having transmittance of a predetermined value or more in infrared and ultraviolet regions and also having a higher melting point than the melting point of the core wire 21. The material of the jig 4 may be fluoride glass or calcogenide glass.

As illustrated in FIGS. 1 and 2, the jig 4 has an approximately cylindrical shape in one example. As illustrated in FIG. 1, the jig 4 has a slit-shaped opening 41. The opening 41 extends along an axial direction of the jig 4. In the following description, the axial direction of the jig 4 is referred to as "axial direction X". The opening 41 continues from one end to the other end of the jig 4 along the axial direction X. Thus, the jig 4 has a C shape in cross section.

An opening width Wd1 of the opening 41 is set according to, for example, a diameter D0 of the core wire 21 and a diameter D1 of each strand 22 (see FIG. 4). The opening width Wd1 is smaller than the diameter D0 of the core wire 21. The opening width Wd1 may be smaller than a radius of the core wire 21. The opening width Wd1 may be equal to the diameter D1 of the strand 22, or may be smaller than the diameter D1 of the strand 22. When the opening width Wd1 is equal to or smaller than the diameter D1 of the strand 22, the scattering of the strands 22 can be effectively suppressed.

The emitting part 2 generates and emits the laser light 10. The emitting part 2 generates the laser light 10 by, for example, a semiconductor laser. The laser light 10 emitted from the emitting part 2 is, for example, a laser beam. The emitting part 2 emits the laser light 10 toward the jig 4.

The moving mechanism 3 is a mechanism that moves the emitting part 2. As illustrated in FIG. 2, the moving mechanism 3 moves the emitting part 2 along the axial direction X. That is, the electric wire manufacturing apparatus 1 can make the laser light 10 scan along the axial direction X. The electric wire manufacturing apparatus 1 includes a main body that supports the moving mechanism 3 and the jig 4, and a controller that controls the moving mechanism 3 and the emitting part 2. In this specification, an optical axis direction of the laser light 10 emitted from the emitting part 2 is referred to as "emission direction Z". The emission direction Z is a direction intersecting the axial direction X. For example, the emission direction Z is a direction perpendicular to the axial direction X.

As illustrated in FIG. 1, the opening 41 of the jig 4 faces the emitting part 2 in the emission direction Z. That is, a width direction Y of the opening 41 is perpendicular to the emission direction Z.

As illustrated in FIG. 3, the core wire 21 of the electric wire 20 is placed inside the jig 4. The electric wire 20 has the core wire 21 and a covering 23. The covering 23 covers the core wire 21 with an end of the core wire 21 exposed therefrom. The covering 23 is, for example, insulating synthetic resin. The core wire 21 has the strands 22. The strands 22 have, for example, the same diameter D1. The exposed portion of the core wire 21 is inserted into a hollow portion of the jig 4. In the following description, the step of placing the core wire 21 inside the jig 4 is referred to as a "placing step".

The placing step is executed by, for example, the electric wire manufacturing apparatus 1. In this case, the electric wire manufacturing apparatus 1 preferably includes a grasping portion to grasp the electric wire 20 and a mechanism to move the grasping portion and insert the core wire 21 into the jig 4. A proximal end 21*a* of the core wire 21 may protrude from the jig 4 to the outside. A space 4*b* may be provided between a distal end surface 21*b* of the core wire 21 and a first end surface 4*a* of the jig 4. In other words, the distal end surface 21*b* of the core wire 21 may be inserted into the jig 4 to a position before the first end surface 4*a* of the jig 4. The space 4*b* makes it difficult for the strands 22 to scatter to the outside.

As illustrated in FIGS. 4 and 5, the emitting part 2 emits the laser light 10 onto an outer circumferential surface 21*c* of the core wire 21. The laser light 10 melts the strands 22 to form the joined portion 24 in the core wire 21 as illustrated in FIG. 6. The joined portion 24 is a portion where the strands 22 are joined together. In the following description, the step of forming the joined portion 24 by emitting the laser light 10 onto the outer circumferential surface 21*c* of the core wire 21 is referred to as a "joining step".

As illustrated in FIGS. 4 and 5, the emitting part 2 emits the laser light 10 onto the core wire 21 through the opening 41. At least part of the laser light 10 passes through the opening 41 to reach the outer circumferential surface 21*c* of the core wire 21. In other words, at least part of the laser light 10 reaches the core wire 21 without being transmitted through the jig 4. A beam diameter DL of the laser light 10 may be larger than the opening width Wd1 of the opening 41. In this case, part of the laser light 10 is transmitted through the jig 4 and emitted onto the core wire 21.

The strands 22 melted by the laser light 10 are merged and integrated with each other. The melt of the strands 22 enters a gap between the strands 22 to integrate the adjacent strands 22. The emitting part 2 of the present embodiment emits the laser light 10 onto the core wire 21 from above. That is, the emitting part 2 emits the laser light 10 onto an upper portion of the core wire 21. This allows the melt to flow down into the gap between the adjacent strands 22 by its own weight and integrate the strands 22 with each other. The electric wire manufacturing apparatus 1 according to the present embodiment can encourage the core wire 21 to become a single line in such a manner.

In the joining step, the periphery of the core wire 21 is covered with the jig 4. Thus, when the strands 22 are irradiated with the laser light 10 to be deformed, the jig 4 prevents the deformation of the strands 22. The jig 4 prevents rupture or damage of the strands 22 and encourages the core wire 21 to become a single line. Additionally, since the periphery of the core wire 21 is covered with the jig 4, heat generated by irradiation with the laser light 10 tends to be accumulated in the jig 4. The accumulated heat encourages melting and integration of the strands 22.

The electric wire manufacturing apparatus 1 can control the shape of the joined portion 24 using the jig 4. The joined portion 24 is shaped in conformity with the shape of an inner circumferential surface of the jig 4. The jig 4 of the present embodiment forms the joined portion 24 having a columnar shape. The jig 4 allows the joined portion 24 formed to have a desired outside diameter. When the jig 4 has the opening 41, the joined portion 24 may have a projection or a bulge shaped in conformity with the shape of the opening 41.

As indicated by an arrow AR1 in FIG. 5, the moving mechanism 3 moves the emitting part 2 along the axial direction X in the joining step. More specifically, the moving mechanism 3 moves the emitting part 2 from the distal end to the proximal end of the core wire 21. The emitting part 2 emits the laser light 10 from a starting point 21*d* to an end point 21*e* of an irradiation range of the core wire 21. The starting point 21*d* of the irradiation range is located at the distal end of the core wire 21. The end point 21*e* of the irradiation range is located inside the jig 4 and close to a second end surface 4*c* of the jig 4. The second end surface 4*c* is an end surface of the jig 4 closer to the covering 23. The emitting part 2 finishes emitting the laser light 10 at the end point 21*e* of the irradiation range.

In the present embodiment, the irradiation range is determined so as to satisfy the following inequality (1). As illustrated in FIG. 6, L2 is a length of the joined portion 24 along the axial direction X, and D2 is a dimension of the joined portion 24 in the direction perpendicular to the axial direction X. When the joined portion 24 has a columnar shape, the dimension D2 is a diameter of the joined portion 24.

$$D2 < L2 \tag{1}$$

The length L2 of the joined portion 24 may be two times or more of the dimension D2 of the joined portion 24, or three times or more of the dimension D2. When the length L2 of the joined portion 24 along the axial direction X is large, the electrical performance of the core wire 21 is improved. With the joined portion 24 formed over a wide range along the axial direction X, variation of electrical resistance in the core wire 21 is reduced.

When the emitting part 2 finishes emitting the laser light 10, the joining step is completed. The core wire 21 is extracted from the jig 4 after execution of the joining step. The step of extracting the core wire 21 may be executed by the electric wire manufacturing apparatus 1, or by an operator. The joined portion 24 is formed in the core wire 21 extracted from the jig 4. In the joined portion 24, the strands 22 are joined and electrically connected to each other. Consequently, decrease in electrical resistance is achieved in the core wire 21.

A terminal may be connected to the electric wire 20 where the joined portion 24 is formed. The step of connecting a terminal to the joined portion 24 is referred to as a "connecting step". In the connecting step, for example, a terminal 5 illustrated in FIG. 7 is connected to the electric wire 20. The terminal 5 has a terminal connection portion 50, a core wire connection portion 51, and a covering connection portion 52. The terminal connection portion 50, the core wire connection portion 51, and the covering connection portion 52 are formed of a conductive metal plate. The terminal connection portion 50 is a portion to be connected to an opponent terminal. The core wire connection portion 51 is a portion to be connected to the core wire 21 of the electric wire 20. The core wire connection portion 51 has a pair of crimp pieces 51a and 51a. The covering connection portion 52 is a portion to be connected to the covering 23 of the electric wire 20. The covering connection portion 52 has a pair of crimp pieces 52a and 52a.

FIG. 8 illustrates the terminal 5 connected to the electric wire 20. The crimp pieces 51a and 51a of the core wire connection portion 51 are caulked to the joined portion 24. In this case, the connecting step includes a step of caulking the crimp pieces 51a and 51a to the joined portion 24. The crimp pieces 51a and 51a are caulked and crimped to the joined portion 24, for example, in a state called B crimp. The core wire connection portion 51 is physically and electrically connected to the joined portion 24.

The crimp pieces 52a and 52a of the covering connection portion 52 are caulked to the covering 23. The crimp pieces 52a and 52a are caulked to the covering 23, for example, such that distal ends of the crimp pieces 52a and 52a abut against each other. The step of caulking the terminal 5 to the electric wire 20 is executed by, for example, a terminal crimping apparatus having an anvil and a crimper. The terminal crimping apparatus caulks the terminal 5 to the electric wire 20 to manufacture a terminal-equipped electric wire 6.

The core wire connection portion 51 may be connected to the joined portion 24 by welding such as laser welding. In this case, the connecting step includes a step of welding the crimp pieces 51a and 51a to the joined portion 24. When the core wire connection portion 51 is welded to the joined portion 24, for example, the joined portion 24 is covered with the pair of crimp pieces 51a and 51a as illustrated in FIG. 9. A gap may be provided between the crimp pieces 51a and 51a. Laser light is then emitted onto the crimp pieces 51a and 51a and the joined portion 24. The laser light melts the crimp pieces 51a and 51a and the joined portion 24 to integrate the crimp pieces 51a and 51a and the joined portion 24. The crimp pieces 52a and 52a of the covering connection portion 52 are caulked to the covering 23.

The joined portion 24 may be brought into pressure contact with a terminal. In this case, the connecting step includes a step of bringing the joined portion 24 into pressure contact with a pressure contact terminal. FIG. 10 illustrates the terminal 5 configured as the pressure contact terminal. The terminal 5 has the terminal connection portion 50, the core wire connection portion 51, and the covering connection portion 52. The terminal connection portion 50 and the covering connection portion 52 are configured similarly to the terminal connection portion 50 and the covering connection portion 52 that have been described with reference to FIG. 7.

The core wire connection portion 51 illustrated in FIG. 10 has a pair of side walls 53 and 53. The pair of side walls 53 and 53 face each other in a width direction of the terminal 5. The core wire connection portion 51 has a pair of first pressure contact blades 54 and 54, and a pair of second pressure contact blades 55 and 55. The first pressure contact blade 54 and the second pressure contact blade 55 are formed by bending a part of the side wall 53. Distal ends of the first pressure contact blades 54 and 54 face each other in the width direction of the terminal 5. Distal ends of the second pressure contact blades 55 and 55 face each other in the width direction of the terminal 5.

As illustrated in FIG. 11, the joined portion 24 of the electric wire 20 is press-fitted into a gap between the pair of first pressure contact blades 54 and 54 and a gap between the pair of second pressure contact blades 55 and 55. The first pressure contact blades 54 and 54 and the second pressure contact blades 55 and 55 hold the joined portion 24 and are electrically connected to the joined portion 24. The crimp pieces 52a and 52a of the covering connection portion 52 are caulked to the covering 23.

As described with reference to FIGS. 12 to 14, the joined portion 24 may be joined to the joined portion 24 of another electric wire 20. The joined portions 24 are joined together to form an assembly of electric wires connected to each other. In the step of forming the electric wire assembly, for example, the joined portion 24 formed in a first electric wire 20A and the joined portion 24 formed in a second electric wire 20B are joined together as illustrated in FIG. 12. In this case, for example, distal end surfaces 24a and 24a of the two joined portions 24 and 24 are brought into abutment against each other. The laser light 10 is emitted onto the distal ends of the joined portions 24 with the distal end surfaces 24a and 24a abutting against each other. The laser light 10 may be emitted by the electric wire manufacturing apparatus 1 or by another apparatus. The laser light 10 welds and integrates the two joined portions 24 and 24 together.

In the step of forming the electric wire assembly, side surfaces 24b and 24b of the two joined portions 24 and 24 may be welded together as illustrated in FIG. 13. For example, the first electric wire 20A and the second electric wire 20B are connected linearly. In this case, the first electric wire 20A extends from the joined portion 24 to one side of the axial direction X, and the second electric wire 20B extends from the joined portion 24 to the other side of the axial direction X. In the step of forming the electric wire assembly, the side surface 24b of one of the joined portions 24 and the side surface 24b of the other joined portion 24 are brought into contact with each other first. With the side surfaces 24b and 24b of the two joined portions 24 and 24 in contact with each other, the laser light 10 is emitted onto the contacting portion. This allows the two joined portions 24 and 24 to be welded together at the side surfaces 24b and the two joined portions 24 and 24 are integrated with each other.

As illustrated in FIG. 14, the two joined portions 24 and 24 may be joined so as to bring center axes X1 and X2 of the joined portions 24 and 24 into a twisted position. For example, the first electric wire 20A and the second electric wire 20B are connected together with their coverings 23 parallel to each other. The joined portion 24 of the first electric wire 20A has the center axis X1. The joined portion 24 of the second electric wire 20B has the center axis X2. The two center axes X1 and X2 neither intersect nor are parallel to each other. In the step of forming the electric wire assembly, the two joined portions 24 and 24 are welded together by the laser light 10 with their side surfaces 24b and 24b in contact with each other in such a positional relation.

As described above, the electric wire manufacturing method according to the present embodiment includes the step of placing the core wire 21 and the step of forming the joined portion 24. In the step of placing the core wire 21, the core wire 21 having the strands 22 is placed inside the jig 4 capable of transmitting the laser light 10. In the step of forming the joined portion 24, the joined portion 24 is formed by emitting the laser light 10 along the direction intersecting the axial direction X onto the outer circumferential surface 21c of the core wire 21 placed inside the jig 4. The joined portion 24 is the portion where the strands 22 are joined together.

In the electric wire manufacturing method according to the present embodiment, the laser light 10 is emitted onto the core wire 21 placed inside the tubular jig 4. The tubular jig 4 can prevent the strands 22 from scattering during melting of the core wire 21. Additionally, the laser light 10 can be transmitted through the jig 4 and emitted onto the core wire 21.

The jig 4 of the present embodiment is transparent. In the step of forming the joined portion 24, the laser light 10 transmitted through the jig 4 may be emitted onto the outer circumferential surface 21c of the core wire 21. Forming the joined portion 24 using the laser light 10 transmitted through the jig 4 can effectively prevent the scattering of the strands 22.

In the present embodiment, the laser light 10 is made to scan along the axial direction X in the step of forming the joined portion 24. Thus, forming the joined portion 24 over a wide range along the axial direction X can improve the electrical performance of the core wire 21.

The electric wire manufacturing method may include the step of connecting the terminal 5 to the joined portion 24. In the step of connecting the terminal, the terminal 5 may be crimped to the joined portion 24 through the crimping step, or the joined portion 24 may be brought into pressure contact with the terminal 5.

The electric wire manufacturing method may include the step of joining the joined portion 24 formed in the first electric wire 20A and the joined portion 24 formed in the second electric wire 20B together.

The electric wire manufacturing apparatus 1 according to the present embodiment includes the jig 4 and the emitting part 2. The jig 4 is the tubular member capable of transmitting the laser light 10. The emitting part 2 emits the laser light 10 along the direction intersecting the axial direction X onto the outer circumferential surface 21c of the core wire 21 placed inside the jig 4. The electric wire manufacturing apparatus 1 according to the present embodiment can prevent the scattering of the strands 22 using the jig 4.

The electric wire 20 is not limited to an electric wire having the covering 23. In the step of forming the assembly of the electric wires 20, three or more joined portions 24 may be welded together. In this case, the three or more joined portions 24 may be integrated by welding one time or a plurality of times. The opening 41 does not have to be provided over the entire range from one end to the other end of the jig 4. For example, the opening 41 may be provided in a part of the range of the axial direction X in the jig 4. The moving mechanism 3 may be configured to move the emitting part 2 along the width direction Y as well as the axial direction X. In this case, the electric wire manufacturing apparatus 1 can cause the laser light 10 to scan along two directions of the axial direction X and the width direction Y.

First Modification of Embodiment

Figure 15:
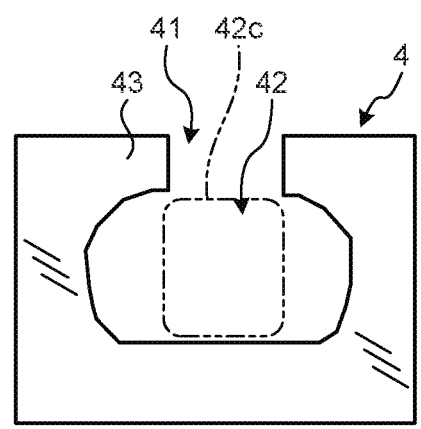
FIG. 15 is a front view of a jig according to a first modification of the embodiment.
Figure 16:
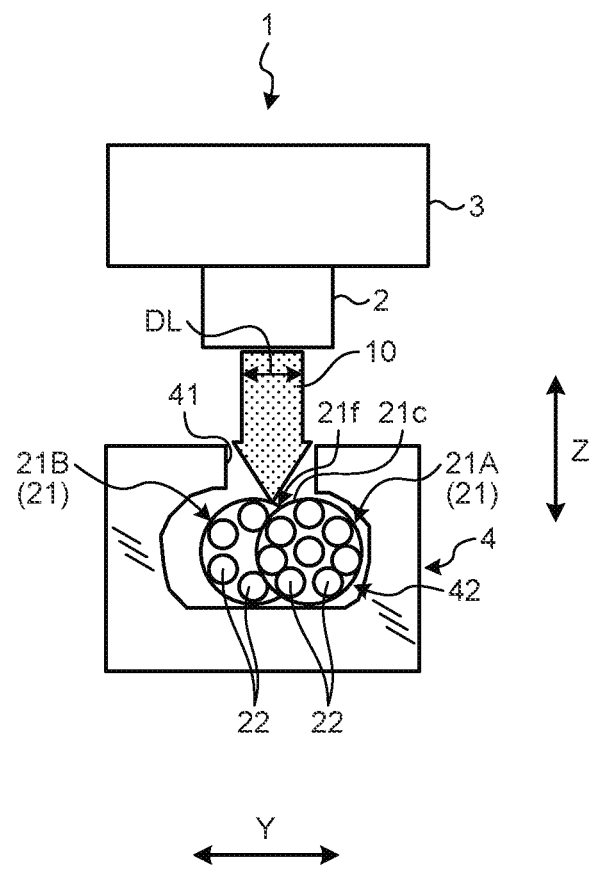
FIG. 16 is a view for explaining a placing step and a joining step according to the first modification of the embodiment.
Figure 17:
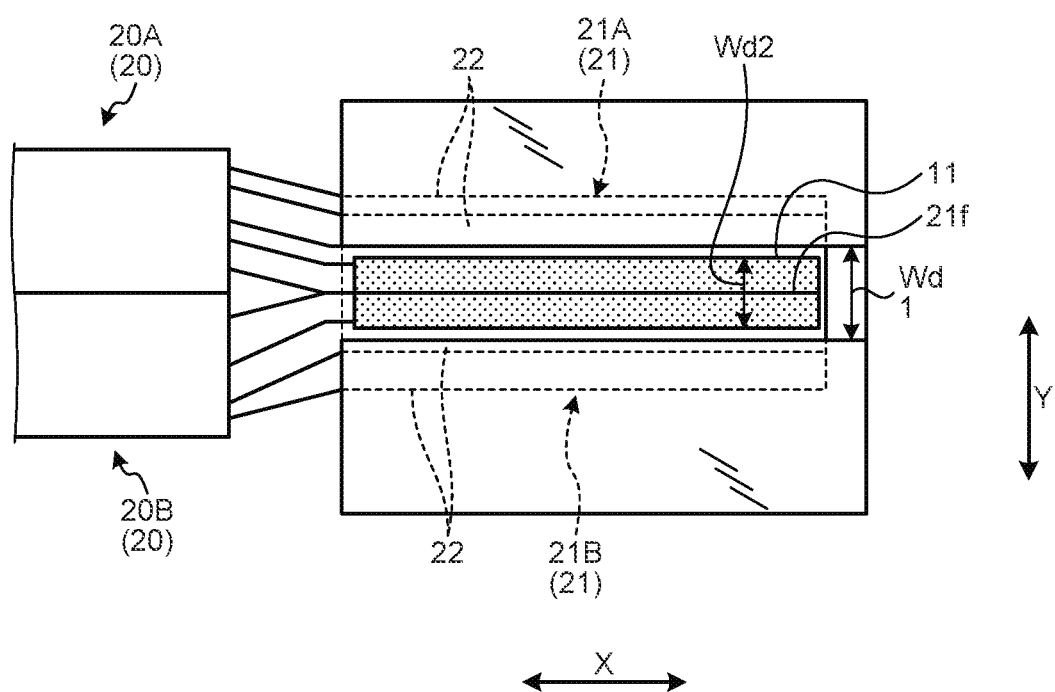
FIG. 17 is a view for explaining the placing step and the joining step according to the first modification of the embodiment.
Figure 18:
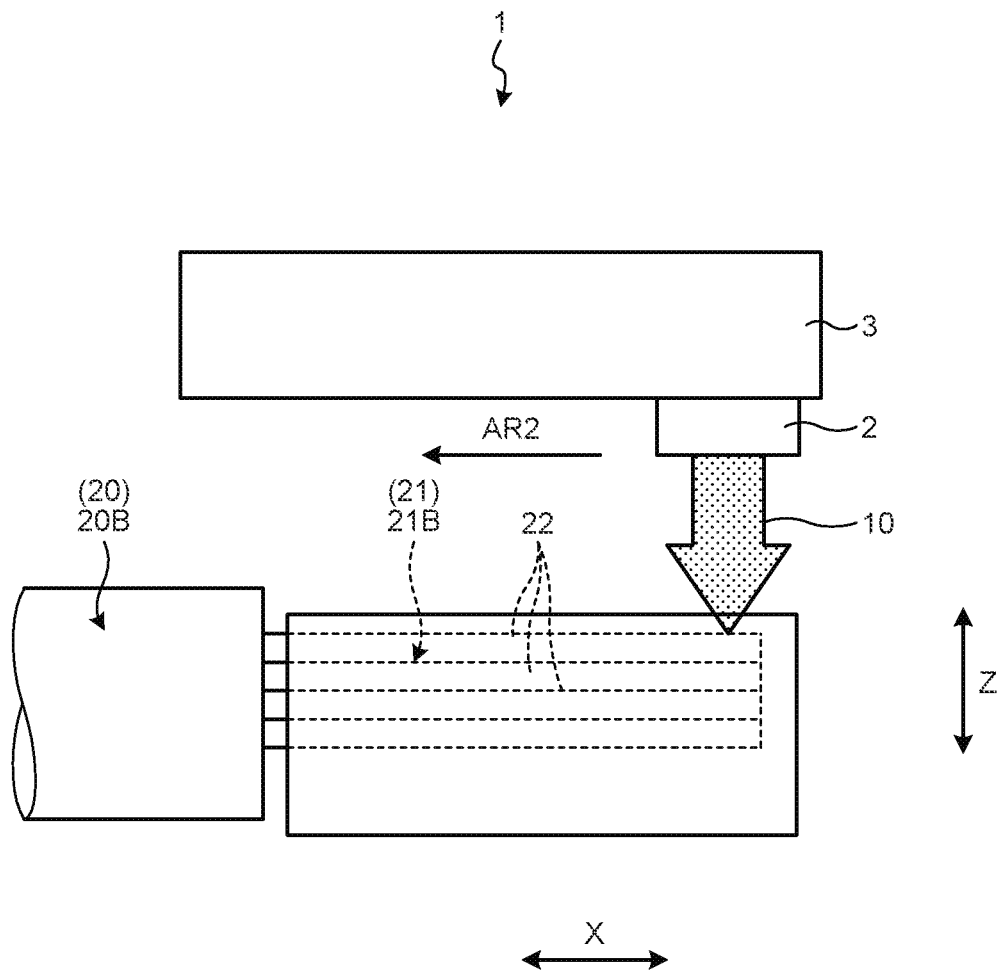
FIG. 18 is a view for explaining the placing step and the joining step according to the first modification of the embodiment.
Figure 19:
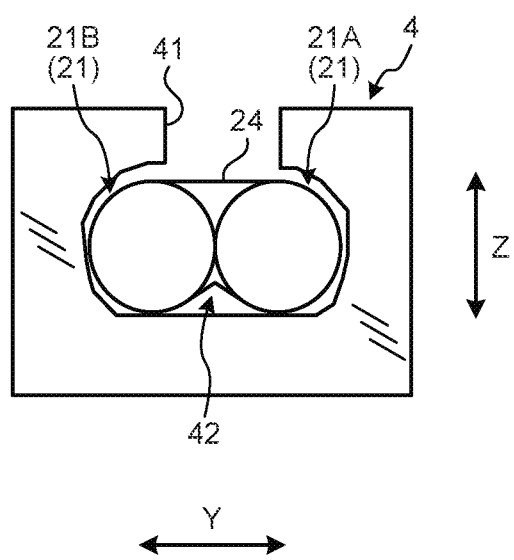
FIG. 19 is a view illustrating a joined region according to the first modification of the embodiment.
Figure 20:
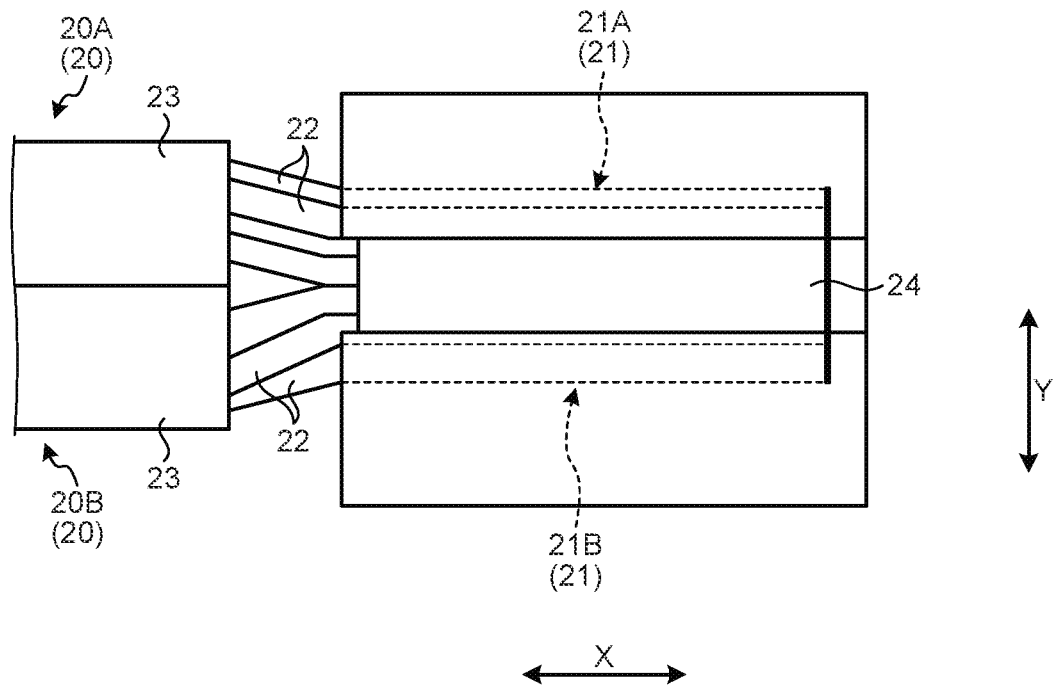
FIG. 20 is a view illustrating the joined region according to the first modification of the embodiment.
Figure 21:
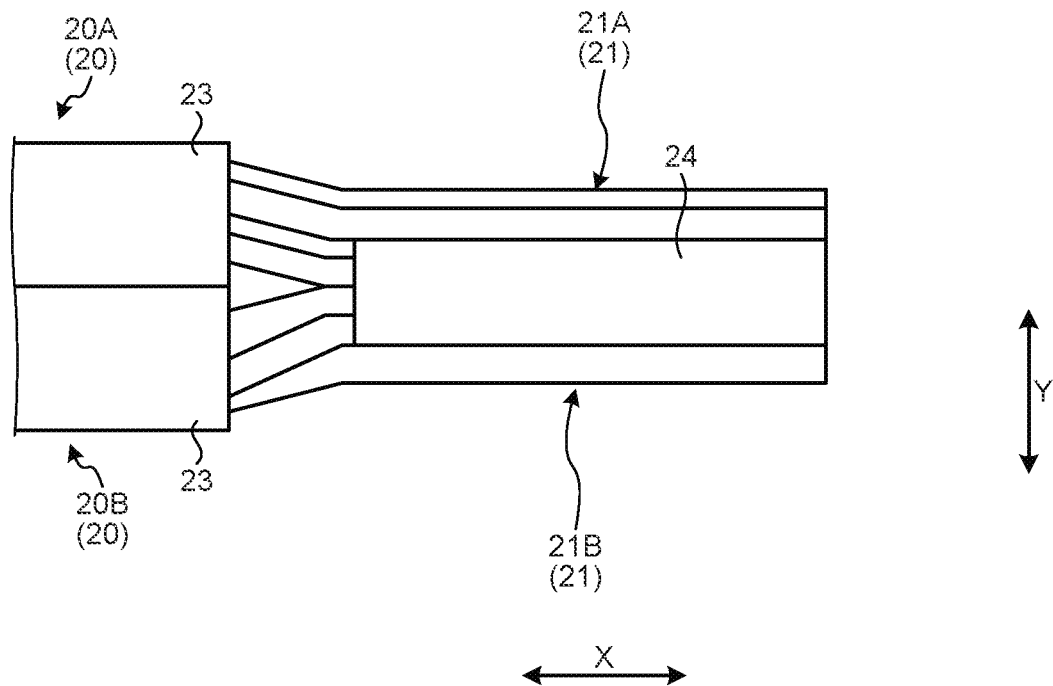
FIG. 21 is a view illustrating the joined region according to the first modification of the embodiment.

A first modification of the embodiment will be described. FIG. 15 is a front view of a jig according to the first modification of the embodiment. FIGS. 16 to 18 are views for explaining a placing step and a joining step according to the first modification of the embodiment. FIGS. 19 to 21 are views illustrating a joined region according to the first modification of the embodiment.

As illustrated in FIG. 15, the jig 4 according to the first modification of the embodiment has an accommodation space 42 capable of accommodating a plurality of the core wires 21. The accommodation space 42 has an approximately oval shape in cross section perpendicular to the axial direction X. The slit-shaped opening 41 is provided in a side wall 43 of the jig 4. The opening 41 is placed in a middle portion of the side wall 43. That is, the opening 41 brings a longitudinal center portion 42c of the accommodation space 42 as viewed from the axial direction X into communication with an outer space.

As illustrated in FIGS. 16 and 17, the core wires 21 are placed inside the jig 4 in the step of placing the core wire 21. For example, two core wires 21 are placed inside the jig 4. One of the core wires 21 is a first core wire 21A of the first electric wire 20A. The other core wire 21 is a second core wire 21B of the second electric wire 20B. The first core wire 21A and the second core wire 21B are placed parallel to each other with their outer circumferential surfaces 21c in contact with each other. The first core wire 21A and the second core wire 21B are accommodated in the accommodation space 42 such that a contacting region 21f between the first core wire 21A and the second core wire 21B faces the opening 41.

FIG. 17 illustrates a target region 11 as a target to be irradiated with the laser light 10. The target region 11 has a predetermined length along the axial direction X and the width direction Y. The illustrated target region 11 is a region corresponding to the opening 41. More specifically, the target region 11 is smaller than a region obtained by projecting the opening 41 on the core wires 21. The length of the target region 11 along the axial direction X is slightly smaller than the length of the jig 4. A width Wd2 of the target region 11 is slightly smaller than the opening width Wd1 of the opening 41.

As indicated by an arrow AR2 in FIG. 18, the moving mechanism 3 moves the emitting part 2 from the distal ends to the proximal ends of the core wires 21. The beam diameter DL of the laser light 10 may be equal to the width Wd2 of the target region 11. A moving range of the emitting part 2 in the axial direction X corresponds to the target region 11.

The laser light 10 emitted onto the first core wire 21A melts and integrates the strands 22 in the first core wire 21A. The laser light 10 emitted onto the second core wire 21B melts and integrates the strands 22 in the second core wire 21B. Moreover, the melt of the first core wire 21A and the melt of the second core wire 21B are integrated with each other. As a result, the first core wire 21A and the second core wire 21B are joined together inside the jig 4 to form the single joined portion 24 as illustrated in FIGS. 19 and 20.

FIG. 21 illustrates the first core wire 21A and the second core wire 21B extracted from the jig 4. Since the joined portion 24 is formed inside the jig 4, the joined portion 24 is shaped in conformity with the shape of the accommodation space 42.

As described above, in the electric wire manufacturing method according to the first modification of the embodiment, the core wires 21 are placed inside the jig 4 in the step of placing the core wire 21. In the step of forming the joined portion 24, the laser light 10 is emitted onto the core wires 21 to join the core wires 21 together and form the single joined portion 24. A plurality of the electric wires 20 can be thereby effectively connected together.

Second Modification of Embodiment

Figure 22:
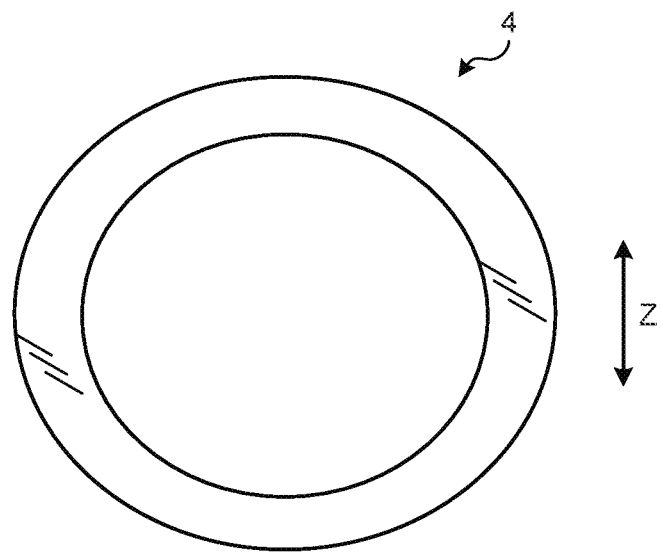
FIG. 22 is a front view of a jig according to a second modification of the embodiment.
Figure 23:
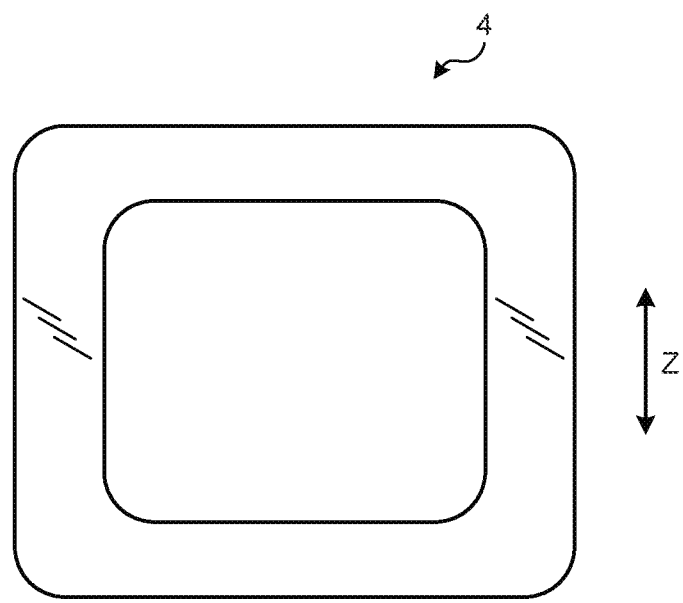
FIG. 23 is a front view of another jig according to the second modification of the embodiment.
Figure 24:
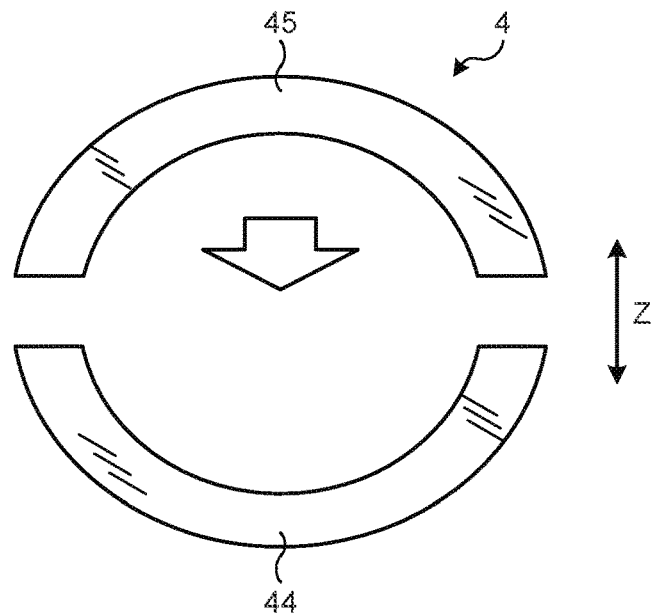
FIG. 24 is a front view of yet another jig according to the second modification of the embodiment.
Figure 25:
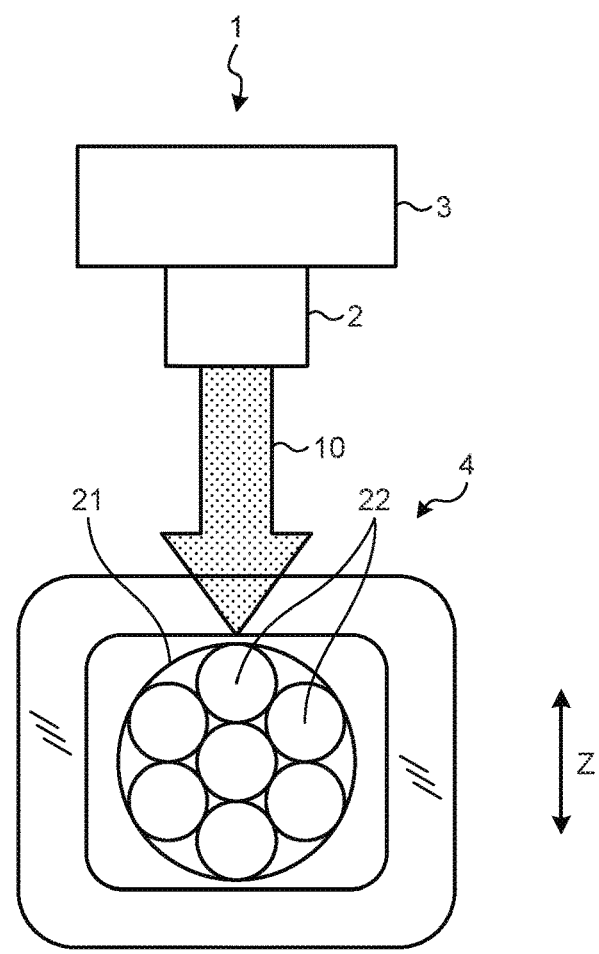
FIG. 25 is a view illustrating a joining step according to the second modification of the embodiment.
Figure 26:
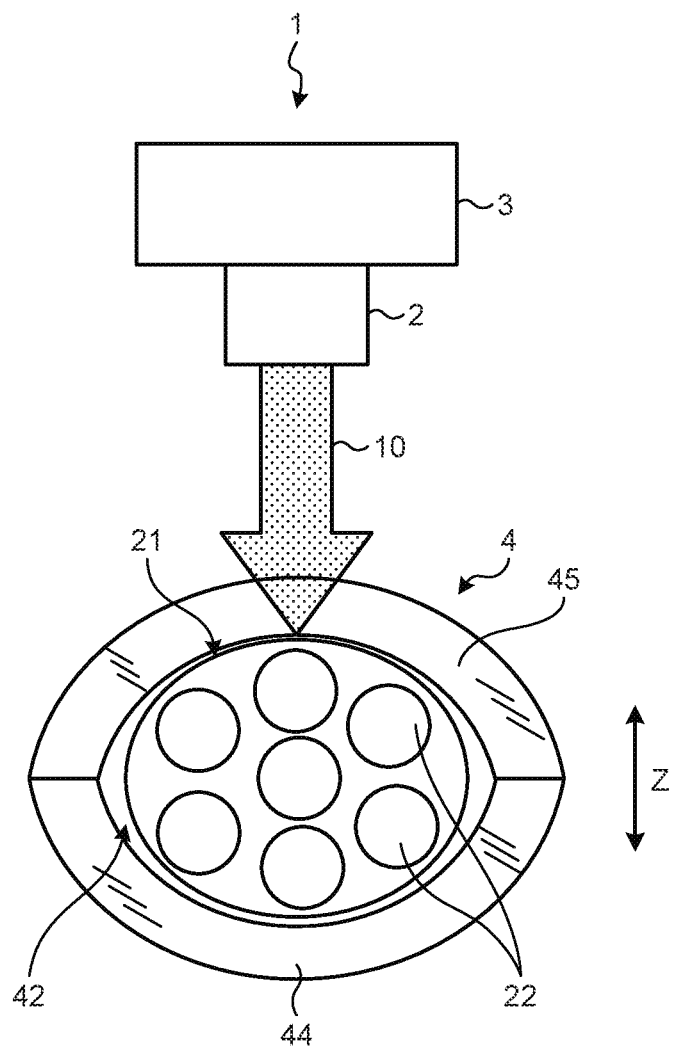
FIG. 26 is a view illustrating another joining step according to the second modification of the embodiment.

A second modification of the embodiment will be described. FIGS. 22 to 24 are front views of a jig according to the second modification of the embodiment. FIGS. 25 and 26 are views illustrating a joining step according to the second modification of the embodiment. The jig 4 according to the second modification of the embodiment differs from the jig 4 of the above embodiment in that the entire circumference of the core wire 21 can be covered with the jig 4.

The jig 4 illustrated in FIGS. 22 and 23 has no slit-shaped opening unlike the jig 4 of the above embodiment. The jig 4 illustrated in FIG. 22 has a cylindrical shape. The jig 4 illustrated in FIG. 23 has a rectangular tube shape. The cross-sectional shape of the jig 4 illustrated in FIG. 23 may be a square shape or a rectangular shape. The cross-sectional shape of the jig 4 may be a polygonal shape other than the square shape.

The jig 4 may be divided into two parts as illustrated in FIG. 24. The jig 4 illustrated in FIG. 24 has a first member 44 and a second member 45. Both of the first member 44 and the second member 45 have a half tube shape. The first member 44 and the second member 45 illustrated herein have a half circular shape in cross section. Thus, the first member 44 and the second member 45 are combined together to constitute the jig 4 having a cylindrical shape.

When the jig 4 illustrated in FIGS. 22 and 23 is used, the core wire 21 is inserted into the jig 4 in the step of placing the core wire 21. The laser light 10 is emitted onto the core wire 21 placed inside the jig 4 in the joining step as illustrated in FIG. 25. The emitting part 2 emits the laser light 10 onto the core wire 21 through the jig 4.

When the jig 4 illustrated in FIG. 24 is used, the first member 44 and the second member 45 hold the core wire 21 therebetween in the step of placing the core wire 21. For example, the core wire 21 is placed on the first member 44, and the second member 45 is then combined with the first member 44. The core wire 21 is accommodated in the accommodation space 42 formed by the first member 44 and the second member 45. After that, the joining step is executed as illustrated in FIG. 26. The emitting part 2 emits the laser light 10 onto the core wire 21 through, for example, the second member 45.

Three or more core wires 21 may be also integrated inside the single jig 4. In this case, the three or more core wires 21 may be joined together by emitting the laser light 10 one time or the three or more core wires 21 may be joined together by emitting the laser light 10 a plurality of times.

The contents disclosed in the above embodiment and modifications can be combined as appropriate and carried out.

The electric wire manufacturing method according to the embodiment includes the step of placing the core wire having the strands inside the tubular member capable of transmitting the laser light, and the step of forming the joined portion where the strands are joined together by emitting the laser light along the direction intersecting the axial direction of the tubular member onto the outer circumferential surface of the core wire placed inside the tubular member. The electric wire manufacturing method according to the embodiment achieves such an effect that the tubular member surrounding the core wire can suppress the strands from scattering.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire manufacturing method comprising:
placing a core wire having a plurality of strands inside a tubular member capable of transmitting laser light such that a space is provided between a distal end surface of the core wire and a first end surface of the tubular member, the tubular member comprising an opening extending from one end of the tubular member to another end of the tubular member in an axial direction of the tubular member such that the tubular member has a C-shape cross section; and
forming a joined portion where the strands are joined together by emitting laser light through the opening and along a direction intersecting the axial direction of the tubular member directly onto an outer circumferential surface of the core wire placed inside the tubular member.

2. The electric wire manufacturing method according to claim 1, wherein
the tubular member is transparent, and
in the forming the joined portion, the laser light transmitted through the tubular member is emitted onto the outer circumferential surface of the core wire.

3. The electric wire manufacturing method according to claim 1, wherein
in the forming the joined portion, the laser light is made to scan along the axial direction.

4. The electric wire manufacturing method according to claim 2, wherein
in the forming the joined portion, the laser light is made to scan along the axial direction.

5. The electric wire manufacturing method according to claim 1, further comprising:
connecting a terminal to the joined portion, wherein
the terminal is crimped to the joined portion, or the joined portion is brought into pressure contact with the terminal in the connecting the terminal.

6. The electric wire manufacturing method according to claim 2, further comprising:
connecting a terminal to the joined portion, wherein
the terminal is crimped to the joined portion, or the joined portion is brought into pressure contact with the terminal in the connecting the terminal.

7. The electric wire manufacturing method according to claim 3, further comprising:
connecting a terminal to the joined portion, wherein
the terminal is crimped to the joined portion, or the joined portion is brought into pressure contact with the terminal in the connecting the terminal.

8. The electric wire manufacturing method according to claim 4, further comprising:
connecting a terminal to the joined portion, wherein
the terminal is crimped to the joined portion, or the joined portion is brought into pressure contact with the terminal in the connecting the terminal.

9. The electric wire manufacturing method according to claim 1, further comprising:
joining the joined portion formed in a first electric wire and the joined portion formed in a second electric wire together.

10. The electric wire manufacturing method according to claim 2, further comprising:
joining the joined portion formed in a first electric wire and the joined portion formed in a second electric wire together.

11. The electric wire manufacturing method according to claim 3, further comprising:

joining the joined portion formed in a first electric wire and the joined portion formed in a second electric wire together.

12. The electric wire manufacturing method according to claim 4, further comprising:

joining the joined portion formed in a first electric wire and the joined portion formed in a second electric wire together.

13. The electric wire manufacturing method according to claim 1, wherein in the placing the core wire, a plurality of the core wires are placed inside the tubular member, and in the forming the joined portion, the laser light is emitted onto the core wires to join the core wires together and form the single joined portion.

14. The electric wire manufacturing method according to claim 2, wherein in the placing the core wire, a plurality of the core wires are placed inside the tubular member, and in the forming the joined portion, the laser light is emitted onto the core wires to join the core wires together and form the single joined portion.

15. The electric wire manufacturing method according to claim 3, wherein in the placing the core wire, a plurality of the core wires are placed inside the tubular member, and in the forming the joined portion, the laser light is emitted onto the core wires to join the core wires together and form the single joined portion.

16. The electric wire manufacturing method according to claim 4, wherein in the placing the core wire, a plurality of the core wires are placed inside the tubular member, and in the forming the joined portion, the laser light is emitted onto the core wires to join the core wires together and form the single joined portion.

17. An electric wire manufacturing apparatus comprising:

a tubular member capable of transmitting laser light and comprising an opening extending from one end of the tubular member to another end of the tubular member in an axial direction of the tubular member such that the tubular member has a C-shape cross section; and an emitting part configured to emit laser light through the opening and along a direction intersecting the axial direction of the tubular member directly onto an outer circumferential surface of a core wire placed inside the tubular member such that a space is provided between a distal end surface of the core wire and a first end surface of the tubular member.

18. An electric wire manufacturing method comprising:

placing a core wire having a plurality of strands inside a tubular jig capable of transmitting laser light;

forming a joined portion where the strands are joined together by emitting laser light along a direction intersecting an axial direction of the tubular jig onto an outer circumferential surface of the core wire placed inside the tubular jig;

extracting the joined portion from the tubular jig;

placing the joined portion inside a terminal; and connecting the terminal to the joined portion by crimping the terminal to the joined portion or through pressure contact of the terminal to the joined portion.

* * * * *